US 6,631,426 B1

(12) United States Patent
Staats

(10) Patent No.: US 6,631,426 B1
(45) Date of Patent: Oct. 7, 2003

(54) AUTOMATIC ID ALLOCATION FOR AV/C ENTITIES

(75) Inventor: Erik P. Staats, Ben Lomond, CA (US)

(73) Assignee: Apple Computer, Inc., Sunnyvale, CA (US)

( * ) Notice: Subject to any disclaimer, the term of this patent is extended or adjusted under 35 U.S.C. 154(b) by 0 days.

(21) Appl. No.: 09/432,872

(22) Filed: Nov. 2, 1999

(51) Int. Cl.⁷ .............................................. G06F 13/00

(52) U.S. Cl. ............................................ 710/9; 710/62

(58) Field of Search ...................... 340/825.06–825.08, 340/825; 369/19; 348/705; 710/1–5, 8–10, 15–19, 62, 72; 713/1–2

(56) References Cited

U.S. PATENT DOCUMENTS

| | | | |
|---|---|---|---|
| 4,156,798 A | 5/1979 | Doelz ..................... 179/15 AL |
| 4,194,113 A | 3/1980 | Fulks et al. ................... 371/20 |
| 5,014,262 A | 5/1991 | Harshavardhar ............. 370/16 |
| 5,253,114 A * | 10/1993 | Lee et al. .................... 359/689 |
| 5,274,631 A | 12/1993 | Bhardwaj .................... 370/60 |
| 5,343,461 A | 8/1994 | Barton et al. ................. 370/13 |
| 5,394,556 A | 2/1995 | Oprescu ..................... 395/800 |
| 5,452,330 A | 9/1995 | Goldstein .................... 375/257 |
| 5,490,253 A | 2/1996 | Laha et al. ................. 395/304 |
| 5,495,481 A | 2/1996 | Duckwall .................. 370/85.2 |
| 5,539,390 A * | 7/1996 | Nagano et al. ......... 340/825.07 |
| 5,541,670 A * | 7/1996 | Hanai ......................... 348/705 |
| 5,568,641 A | 10/1996 | Nelson ....................... 395/700 |
| 5,583,922 A | 12/1996 | Davis et al. .................. 379/96 |
| 5,621,659 A * | 4/1997 | Matsumoto et al. ... 340/825.08 |
| 5,630,173 A | 5/1997 | Oprescu ..................... 395/860 |
| 5,640,595 A | 6/1997 | Baugher et al. ............. 395/830 |
| 5,684,715 A | 11/1997 | Palmer ....................... 365/514 |
| 5,701,476 A | 12/1997 | Fenger ....................... 395/652 |
| 5,701,492 A | 12/1997 | Wadsworth et al. ......... 395/712 |
| 5,712,834 A * | 1/1998 | Nagano et al. ............... 369/19 |
| 5,719,862 A | 2/1998 | Lee et al. .................... 370/355 |
| 5,784,648 A | 7/1998 | Duckwall ................... 395/860 |
| 5,802,048 A | 9/1998 | Duckwall ................... 370/389 |
| 5,802,057 A | 9/1998 | Duckwall et al. ........... 370/408 |
| 5,805,073 A * | 9/1998 | Nagano et al. ......... 340/825.07 |
| 5,809,331 A | 9/1998 | Staats et al. ................. 395/830 |
| 5,832,298 A | 11/1998 | Sanchez et al. ............. 395/828 |
| 5,835,761 A | 11/1998 | Ishii et al. ................... 395/653 |
| 5,867,730 A | 2/1999 | Leyda ......................... 395/830 |
| 5,875,301 A | 2/1999 | Duckwall et al. ...... 395/200.51 |
| 5,938,764 A | 8/1999 | Klein ............................. 713/1 |
| 5,968,152 A | 10/1999 | Staats ......................... 710/104 |
| 5,970,052 A | 10/1999 | Lo et al. ..................... 370/241 |

(List continued on next page.)

OTHER PUBLICATIONS

"IEEE Standard for a High Performance Serial Bus", IEEE Standard 1394–1995, Institute of Electrical and Electronics Engineers, Inc., Aug. 30, 1996.

"IEEE Standard for a High Performance Serial Bus–Amendment 1", Institute of Electrical and Electronics Engineers, Inc., pp. 1–196, 2000 (no month).

"AV/C Digital Interface Command Set General Specification, Rev. 3.0", 1394 Trade Association, pp. 4–5, 20–34, Apr. 15, 1998.

"Enhancements to the AV/C General Specification 3.0 Version 1.0FC1", 1394 Trade Association, pp. 4, 6–17, Nov. 5, 1998.

"Fibre Channel–Methodologies for Jitter Specification", NCITS TR–25–1999, Jitter Working Group Technical Report, Rev. 10, pp. 1–96, Jun. 9, 1999.

*Primary Examiner*—Christopher B. Shin
(74) *Attorney, Agent, or Firm*—Sierra Patent Group, Ltd.

(57) ABSTRACT

Disclosed herein is an automatic ID allocation technique for use in AV/C device applications. The method allows ID assignment without manual user intervention. The method includes assigning an ID to an entity when called to do so upon detection of a new entity. Furthermore, old IDs are reallocated for later use upon disconnection of the associated entity.

12 Claims, 4 Drawing Sheets

U.S. PATENT DOCUMENTS

| | | | | |
|---|---|---|---|---|
| 5,987,605 | A | 11/1999 | Hill et al. | 713/2 |
| 6,032,202 | A | 2/2000 | Lea et al. | 710/8 |
| 6,038,625 | A | 3/2000 | Ogino et al. | 710/104 |
| 6,070,187 | A | 5/2000 | Subramaniam et al. | 709/220 |
| 6,073,206 | A | 6/2000 | Piwonka et al. | 711/102 |
| 6,122,248 | A | 9/2000 | Murakoshi et al. | 370/216 |
| 6,131,129 | A | 10/2000 | Ludtke | 710/5 |
| 6,133,938 | A | 10/2000 | James | 348/8 |
| 6,138,196 | A | 10/2000 | Takayama et al. | 710/105 |
| 6,141,702 | A | 10/2000 | Ludtke et al. | 710/5 |
| 6,141,767 | A | 10/2000 | Hu et al. | 714/1 |
| 6,157,972 | A | 12/2000 | Newman et al. | 710/100 |
| 6,160,769 | A | 12/2000 | Zou | 370/257 |
| 6,167,532 | A | 12/2000 | Wiseccup | 713/300 |
| 6,173,327 | B1 | 1/2001 | De Borst et al. | 709/231 |
| 6,192,189 | B1 | 2/2001 | Fujinami et al. | 386/96 |
| 6,202,210 | B1 | 3/2001 | Ludtke | 725/20 |
| 6,233,615 | B1 | 5/2001 | Van Loo | 709/224 |
| 6,233,624 | B1 | 5/2001 | Hyder et al. | 709/327 |
| 6,247,083 | B1 | 6/2001 | Hake et al. | 710/107 |
| 6,253,255 | B1 | 6/2001 | Hyder et al. | 709/321 |
| 6,260,063 | B1 | 7/2001 | Ludtke et al. | 709/224 |
| 6,266,334 | B1 | 7/2001 | Duckwall | 370/397 |
| 6,266,701 | B1 | 7/2001 | Sridhar et al. | 709/232 |
| 6,282,597 | B1 | 8/2001 | Kawamura | 710/105 |
| 6,295,479 | B1 | 9/2001 | Shima et al. | 700/83 |
| 6,308,222 | B1 | 10/2001 | Krueger et al. | 709/247 |
| 6,311,228 | B1 | 10/2001 | Ray | 709/301 |
| 6,345,315 | B1 | 2/2002 | Mishra | 709/329 |
| 6,353,868 | B1 | 3/2002 | Takayama et al. | 710/129 |
| 6,385,679 | B1 | 5/2002 | Duckwall et al. | 710/119 |

* cited by examiner

AUTOMATIC ID ALLOCATION FOR AV/C ENTITIES

The IEEE 1394 multimedia bus standard is to be the "convergence bus" bringing together the worlds of the PC and digital consumer electronics. It is readily becoming the digital interface of choice for consumer digital audio/video applications, providing a simple, low-cost and seamless plug-and-play interconnect for clusters of digital A/V devices, and it is being adopted for PCs and peripherals.

The original specification for 1394, called IEEE 1394-1995, supported data transmission speeds of 100 to 400 Mbits/second. Most consumer electronic devices available on the market have supported either 100 or 100/200 Mbits/second; meaning that plenty of headroom remains in the 1394 specification. However, as more devices are added to a system, and improvements in the quality of the A/V data (i.e., more pixels and more bits per pixel) emerge, a need for greater bandwidth and connectivity flexibility has been indicated.

The 1394a specification (pending approval) offers efficiency improvements, including support for very low power, arbitration acceleration, fast reset and suspend/resume features. However, current methods for allocating ID's to new devices are both manual and crude especially when considered in the context of 'hot swappable" devices.

As indicated in the AV/C Digital Interface Command Set General Specification (hereinafter, the General Specification): an AV unit is the physical instantiation of a consumer electronic device, e.g., a camcorder or a VCR, within a Serial Bus node; an AV subunit is an instantiation of a virtual entity that can be identified uniquely within an AV unit and offers a set of coherent functions; an AV/C is an Audio/video control; and a plug is a physical or virtual end-point of connection implemented by an AV unit or subunit that may receive or transmit isochronous or other data—plugs may be Serial Bus plugs, accessible through the PCR's (PCR: is a Plug Control Register, as defined by IEC 61883, Digital Interface for Consumer Electronic Audio/Video Equipment; further, an iPCR: is an input plug PCR, as defined by IEC 61883 and an oPCR: is an output plug PCR, as defined by IEC 61883) they may be external, physical plugs on the AV unit; or they may be internal virtual plugs implemented by the AV subunits.

An AV/C target implementation is made up of multiple entities including AV/C subunits and plugs. Each separate entity has an associated ID number used to specify that entity when an AV/C controller sends a command acting upon that entity.

The implementation of the AV/C target device must ensure that the IDs used for the target entities are unique among all entities of the same type. In addition they must be between 0 and n−1 where n is the number of a particular type of entity. Thus an AV/C subunit and plug may both have an ID of 0, but two AV/C subunits may not both have an ID of 0.

The old methods for implementing AV/C target entities are to statically allocate the IDs for each entity. Thus, when implementing the software for the entities, the number of entities must be known in advance. Updating the implementation to support a new entity requires manual allocation of another ID. In addition, removal of an entity requires manual deallocation of its ID, and if its ID (m) is less than n−1 (e.g., 0<m<n−1), thus, residing somewhere in the middle of the identification listings, the IDs for the entities between m+1 and n−1 must be manually decremented.

Modularity of software components, and independence of implementation between software components, are elements of good software design. However, the manual allocation of IDs described above prevents total independence between the implementations of the AV/C entities. In addition, the manual allocation prevents an implementation of dynamic AV/C entities as would be needed when components are hot swapped into an AV/C device.

BRIEF DESCRIPTION OF THE INVENTION

This invention provides a means of automatically and dynamically allocating IDs for AV/C entities. The IDs do not need to be determined during the implementation of the entities. The IDs are determined at run time. This has the benefit of allowing an implementation of dynamic AV/C entities.

This invention provides an AV/C entity allocation service which maintains a list of the currently allocated IDs. This list is initially empty. When an AV/C entity is initialized, it calls the allocation service to allocate an ID which it then uses for the initialized entity. The allocation service allocates an ID by starting with an ID of 0. The service then searches its allocated ID list to see if the current ID has already been allocated. If it finds the ID in the list, it increments its current ID and searches the list again. If it does not find the ID, it adds the current ID to the allocated list and returns the ID to the entity.

BRIEF DESCRIPTION OF THE DRAWING FIGURES

DETAILED DESCRIPTION OF A PREFERRED EMBODIMENT

Persons of ordinary skill in the art will realize that the following description of the present invention is illustrative only and not in any way limiting. Other embodiments of the invention will readily suggest themselves to such skilled persons having the benefit of this disclosure.

Figure 1:
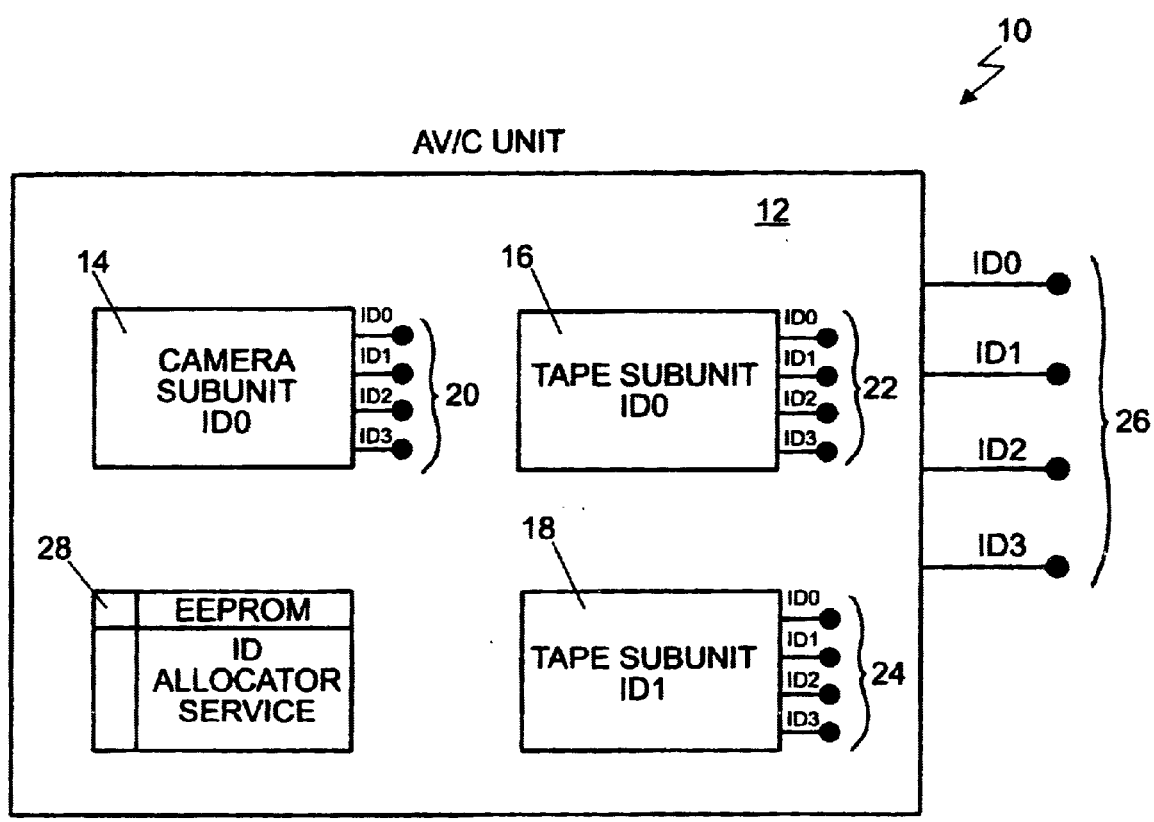
FIG. 1 is schematic overview of the present invention.

Generally speaking, units, plugs, and subunits are known as entities. According to the General Specification, each entity must have a unique ID associated with it within its class. Referring now to FIG. 1, an schematic diagram of an exemplary system 10 is depicted. An AV/C unit 12, such as DV camcorder, is shown including a camera subunit 14 and two tape subunits 16 and 18 therein, as well as four external physical plugs 26. Furthermore, the camera subunit includes four virtual plugs 20, tape subunit 16 includes four virtual plugs 22 and tape subunit 18 includes four virtual plugs 24. In viewing the depicted example, 20 entities are indicated. That is, the AV/C unit is an entity (which would be significant if attached to other units), each subunit is an entity, and each plug, both physical and virtual is an entity. Therefore, there are 20 entities depicted within 7 classes (1 unit class, 2 subunit classes, and 4 plug classes).

Since each entity must have a unique ID associated with it, the AV/C unit would have an ID0 (not shown since no other unit are depicted in FIG. 1), camera subunit 14 has ID0 associated with it, tape subunit 16 has an ID0 associated with it, but the second tape subunit 18 is ID1. Each set of plugs within each unit or subunit, likewise includes a unique ID as shown.

Figure 2:
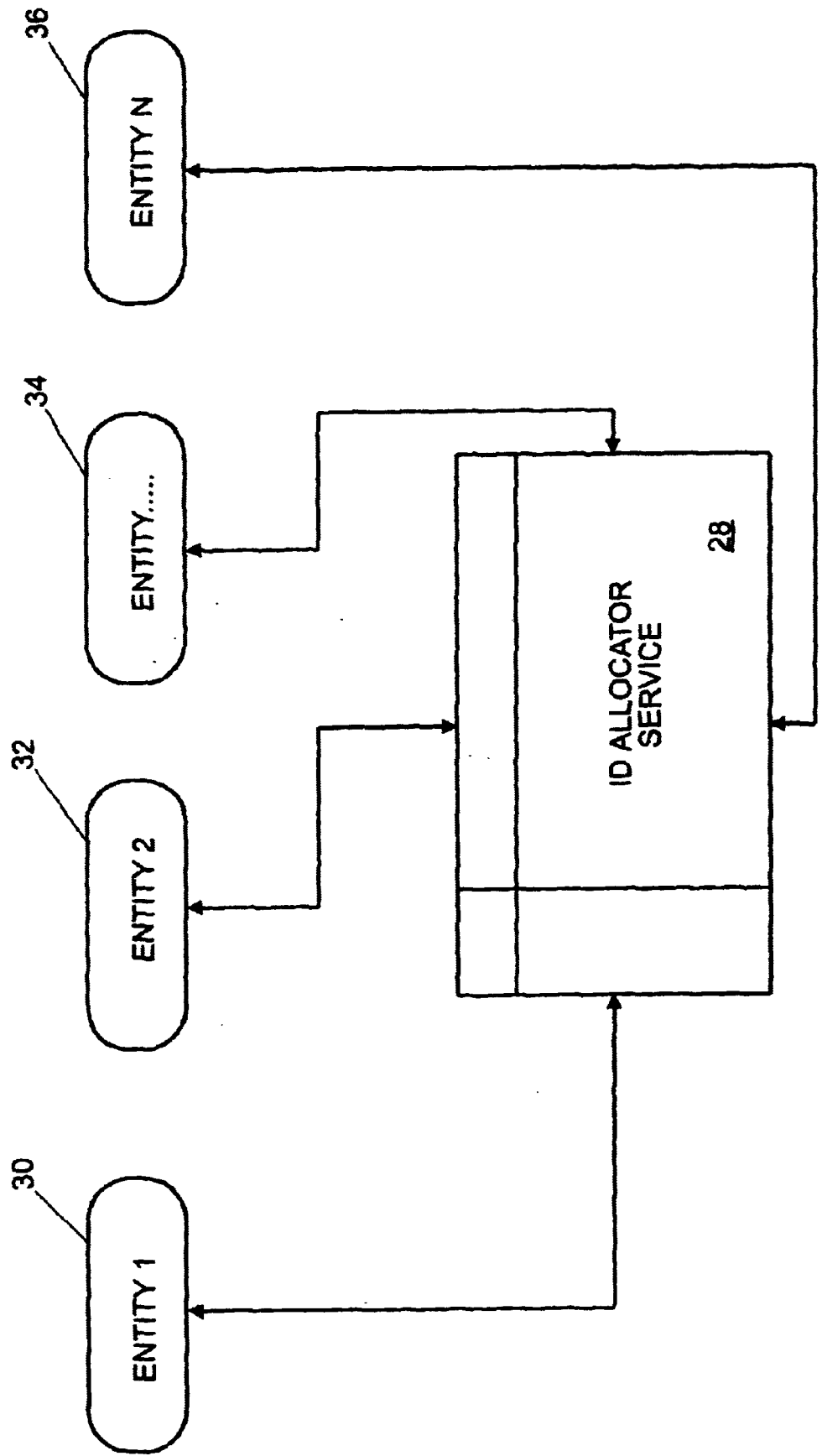
FIG. 2 is a schematic drawing of entity/service interaction of the present invention.

To allocate these IDs in an ordered fashion, ID allocator service 28 lies within a memory space, such as an EEPROM. Referring now to FIG. 2, as can be seen schematically, each entity 30–36 is in operative communication with the ID allocator service 28. The ID allocator service 28 serves the function of dynamically allocating IDs to each sensed entity. That is, once an entity is detected, usually on startup, a call is made to the ID allocator service 28 to assign an ID to the new entity. Likewise, when an entity is removed and another like entity is added, a call is made to the ID allocator service 28 to assign the first available unused ID, which may be that of a previous entity.

Figure 3:
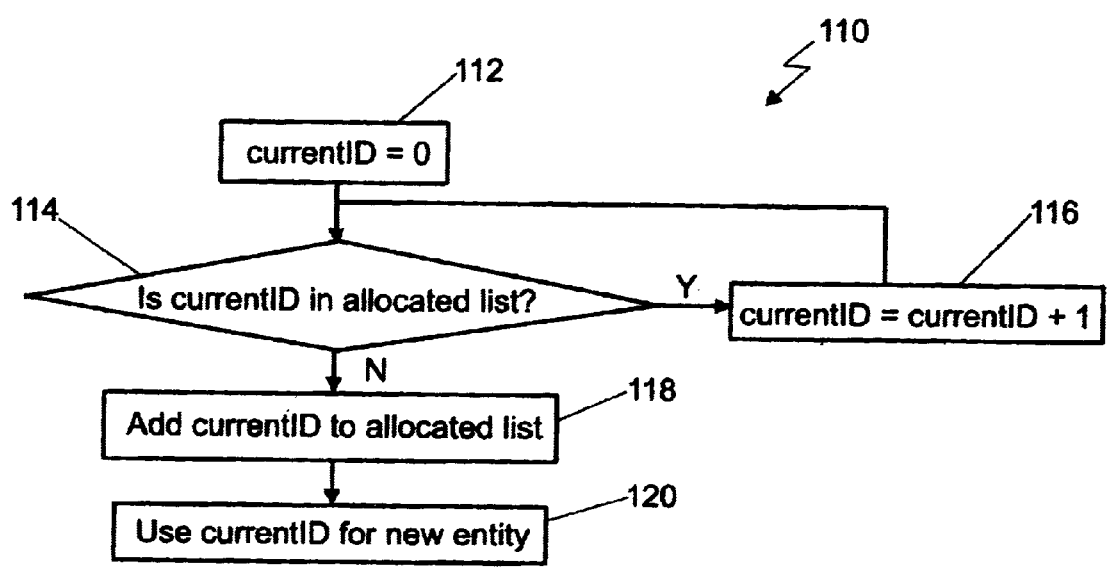
FIG. 3 is a flow diagram of the method form allocating IDs of the present invention.

To accomplish this task, and referring now to FIG. 3, an ID allocation system 110 is depicted. The system 110 includes as a first activity 112 staring with a current ID equal to zero. If the ID0 is already allocated to an entity, then the system will look to the next ID as in activities 114 and 116. This process will recur until the next available, unused, ID is located. When the next unused ID is located, the newly found entity is assigned that ID by mapping that entity to that ID in an allocation list as in activities 118 and 120. For example, and referring again to FIG. 1, when the tape subunit 18 was added, the device was detected and a call was made to the ID allocator service 28. The ID allocator service first checked to see if ID0 was available in the tape subunit class. The service discovered that ID0 was being used already, so it next checked ID1. As ID1 was available, ID1 was assigned to tape subunit 18. No user intervention was required to assign the ID other than adding the entity and turning the system on.

Figure 4:
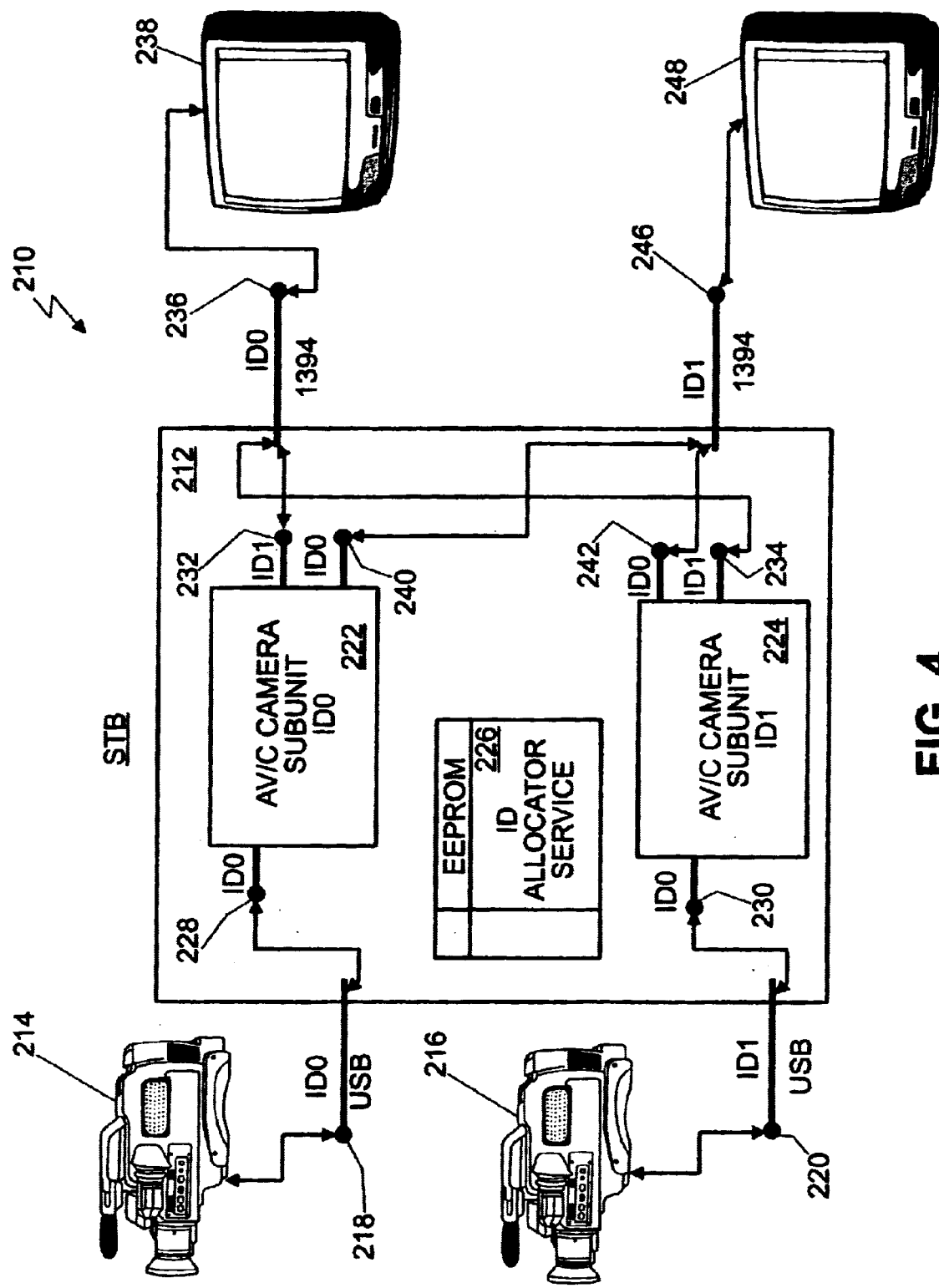
FIG. 4 is an exemplary embodiment of the present invention.

In use and operation, another exemplary schematic 210 is depicted in FIG. 4. In this example a settop box (212) will act as a bridge between two video cameras on one side of the bridge and two televisions on the other. Included with the settop box are two USB ports 218 and 220 and two 1394 ports 236 and 246. The televisions 238 and 248 are connected to the 1394 ports 236 and 246 respectively via an appropriate 1394 cable. In this example, the televisions are acting as hosts or servers for potential transmissions of video and audio through the STB 212.

It will be understood that included within the STB 212 will be a USB AV/C subunit software module for detecting USB devices on the USB buses. Once a device is connected to one of the USB ports, the USB software will detect the entity and make a call to the ID allocator service as described above.

In this example, then, the camera 214 is first connected via an appropriate USB cable to port 218. The system is turned on, and the new entity is detected by the USB software which builds an AV/C camera subunit 222 and a virtual plug 228 to put in operative communication with port 218. Plug 228 is an input plug, whereas plugs 232 and 240 are output plugs, and hence AV/C considers them to be of different classes, and as such separate class IDs are associated therewith. The USB software, thus, makes a call to the ID allocator service 226 which initiates its recursive search for an ID as discussed with respect to FIG. 3. ID0 is then assigned to AV/C camera subunit 222 and then an ID0 is assigned to virtual plug 228. Then, as the bridge serves but one purpose in this example, the subunit 222 must be put in operative communication with ports 236 and 246 via virtual plug 232 and 240 respectively. The ID allocator thus, assigns the next available ID, which in this case is ID0, to the virtual plug 240 and the next ID to virtual plug 232 or ID1 thereby conforming this portion of the system with the General Specification's requirement of unique ID's for each entity.

Thereafter, a second camera 216 is added to the STB 212 at port 220. Another call is made to the ID allocator service 226. The ID allocator service then assigns the next available ID, which is ID1 in this case, to the new subunit 224. Again, three virtual plugs are needed to bridge the camera with the televisions 238 and 248 at ports 236 and 246 respectively. Thus, a first virtual input plug 230 is assigned ID0. Then a first virtual output plug 242 is assigned ID0, while a second virtual output plug 234 is assigned ID1. Without the allocator 226, the second subunit could not be built without manually assigning a new ID. As one can appreciate, such is quite a cumbersome and user unfriendly task. Furthermore, if, thereafter, camera 214 were unplugged from plug 218, the IDs associated therewith would be removed from the ID allocator list and be available for future use automatically in the present system.

While embodiments and applications of this invention have been shown and described, it would be apparent to those skilled in the art that many more modifications than mentioned above are possible without departing from the inventive concepts herein. The invention, therefore, is not to be restricted except in the spirit of the appended claims.

What is claimed is:

1. In an audio/video controller entity, an automatic ID allocation method for audio/video control entities, the method comprising:

providing a list for currently allocated audio/video control entities;

when an audio/visual control entity is initialized, allocating a current identifier value to the initialized entity;

searching the list to see if a value matching the current identifier is contained in the list;

if a value matching the current identifier is contained in the list, then until the current identifier value does not match a value contained on the list:
incrementing the current identifier value; and
checking the list to see if the incremented value is contained in the list;

if the current identifier value is not contained in the list, then adding the current identifier value to the list.

2. The method of claim 1, wherein the list is initially empty.

3. The method of claim 1, wherein the current identifier value allocated to the initialized entity is zero.

4. The method of claim 1, wherein an entity comprises a audio/video control unit.

5. The method of claim 1, wherein an entity comprises an audio/video control plug.

6. The method of claim 1, wherein an entity comprises an audio/video control subunit.

7. In an audio/video controller entity, a computer program product comprising instructions, which when executed:

provide a list for currently allocated audio/video control entities;

when an audio/visual control entity is initialized, allocate a current identifier value to the initialized entity;

search the list to see if a value matching the current identifier is contained in the list;

if a value matching the current identifier is contained in the list, then until the current identifier value does not match a value contained on the list:
increment the current identifier value; and
check the list to see if the incremented value is contained in the list;

if the current identifier value is not contained in the list, then add the current identifier value to the list.

8. The computer program product of claim 7, wherein the list is initially empty.

9. The computer program product of claim 7, wherein the current identifier value allocated to the initialized entity is zero.

10. The computer program product of claim 7, wherein an entity comprises a audio/video control unit.

11. The computer program product of claim 7, wherein an entity comprises an audio/video control plug.

12. The computer program product of claim 7, wherein an entity comprises an audio/video control subunit.

* * * * *